(12) United States Patent
Doberstein et al.

(10) Patent No.: US 6,424,678 B1
(45) Date of Patent: Jul. 23, 2002

(54) SCALABLE PATTERN METHODOLOGY FOR MULTI-CARRIER COMMUNICATION SYSTEMS

(75) Inventors: Kevin G. Doberstein, Elmhurst; Bradley M. Hiben, Glen Ellyn, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/630,235

(22) Filed: Aug. 1, 2000

(51) Int. Cl.[7] .................................................. H04K 1/10
(52) U.S. Cl. ..................... 375/260; 375/298; 375/364; 370/510
(58) Field of Search .................... 375/260, 261, 375/298, 340, 364; 370/476, 491, 510

(56) References Cited

U.S. PATENT DOCUMENTS

| | | | |
|---|---|---|---|
| 5,241,544 A | | 8/1993 | Jasper et al. |
| 5,343,499 A | | 8/1994 | Jasper et al. ................ 325/261 |
| 5,381,449 A | | 1/1995 | Jasper et al. |
| 5,519,730 A | * | 5/1996 | Jasper ........................ 375/260 |
| 5,533,004 A | | 7/1996 | Jasper et al. |
| 5,809,083 A | * | 9/1998 | Wright ........................ 375/285 |
| 6,097,711 A | * | 8/2000 | Okawa et al. ............... 370/335 |

FOREIGN PATENT DOCUMENTS

WO WO 93/09622 5/1993

OTHER PUBLICATIONS

Crochiere and Rabiner, "Multirate Digital Signal Processing.," 1983, pp. 297–324.

* cited by examiner

Primary Examiner—Temesghen Ghebretinsae
(74) Attorney, Agent, or Firm—Steven R. Santema

(57) ABSTRACT

A scalable pattern methodology defining positions of synchronization symbols, pilot symbols and data symbols for various numbers of sub-channels in a multi-carrier communication system. A base pattern (510) is defined identifying positions of data symbols, synchronization symbols and pilot symbols for a first number of sub-channels corresponding to a first bandwidth. The base pattern is replicated or scaled to form an expanded pattern (512, 514) identifying positions of data symbols, synchronization symbols and pilot symbols for an expanded number (M) of sub-channels corresponding to a second bandwidth. The pattern methodology may be implemented by a transmitter (100) having subdivided an original information signal into M bit streams and having encoded each of the M bit streams to 16QAM symbols to form M symbol streams, by inserting synchronization and pilot symbols into each of the M symbol streams at positions determined by the expanded pattern. The pattern methodology allows a receiver (600) to perform pilot interpolation in the M symbol streams with the same set of pilot interpolation filters that would be required to perform pilot interpolation in the symbol streams of the base pattern.

6 Claims, 4 Drawing Sheets

SCALABLE PATTERN METHODOLOGY FOR MULTI-CARRIER COMMUNICATION SYSTEMS

FIELD OF THE INVENTION

This invention relates generally to multi-carrier communication systems, including but not limited to radio frequency (RF) communication systems. More particularly, this relates to a scalable pattern methodology for multi-carrier communication systems.

BACKGROUND OF THE INVENTION

Multi-carrier communication systems are well known in the art. Pursuant to many such systems, an information-bearing signal, such as serial digitized voice or digital data is subdivided into a plurality of bit streams, each of which is encoded into symbols (e.g., 16QAM symbols) to form a corresponding plurality of symbol streams. Synchronization and pilot symbols are inserted into each of the plurality of symbol streams, yielding a plurality of composite symbol streams. The composite symbol streams are used to modulate separate carrier signals, yielding a corresponding plurality of sub-channels each occupying a discrete frequency band and carrying a portion of the information in the original information-bearing signal. The plurality of sub-channels are combined into a composite signal that is transmitted over an RF channel from a first location to a second location. At the second location, a receiver performs generally the inverse operations, demodulating and detecting each sub-channel separately. Pilot interpolation is performed to determine the carrier's phase and to estimate the effects of channel impairments, such as fading, multi-path effects, etc., and errors are corrected to overcome the effect of the channel impairments and reconstruct the original information signal.

Generally, the amount of information that may be carried by any communication system is a function of the available bandwidth. One of the advantageous aspects of multi-carrier communication systems is that different channel types (e.g., having larger bandwidths) may be accommodated by increasing the number of sub-channels, to the extent that the bandwidth of the total number of sub-channels do not exceed the available bandwidth. Heretofore, however, the sequences of synchronization and pilot symbols inserted among the data symbols for particular numbers of sub-channels, corresponding to particular bandwidths were uniquely defined without regard to scalability. Consequently, unique pilot interpolation techniques were required for different receivers adapted to detect information in the different numbers of sub-channels, corresponding to the different bandwidths. Generally, the greater the number of sub-channels and the greater the corresponding bandwidth, the greater computational complexity was required in the receiver. A multi-carrier communication system that simplifies the complexity of the receiver would be an improvement over the prior art.

Accordingly, there is a need for a method of defining patterns of synchronization, pilot and data symbols usable in a multi-carrier communication system that scales readily between different numbers of sub-channels and different corresponding bandwidths. Advantageously, the pattern methodology should define a pattern of synchronization, pilot and data symbols for a first number of sub-channels that is scalable to multiple numbers of sub-channels and allows for using similar pilot interpolation techniques for any of the scaled versions. The present invention is directed to satisfying or at least partially satisfying these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

Figure 1:
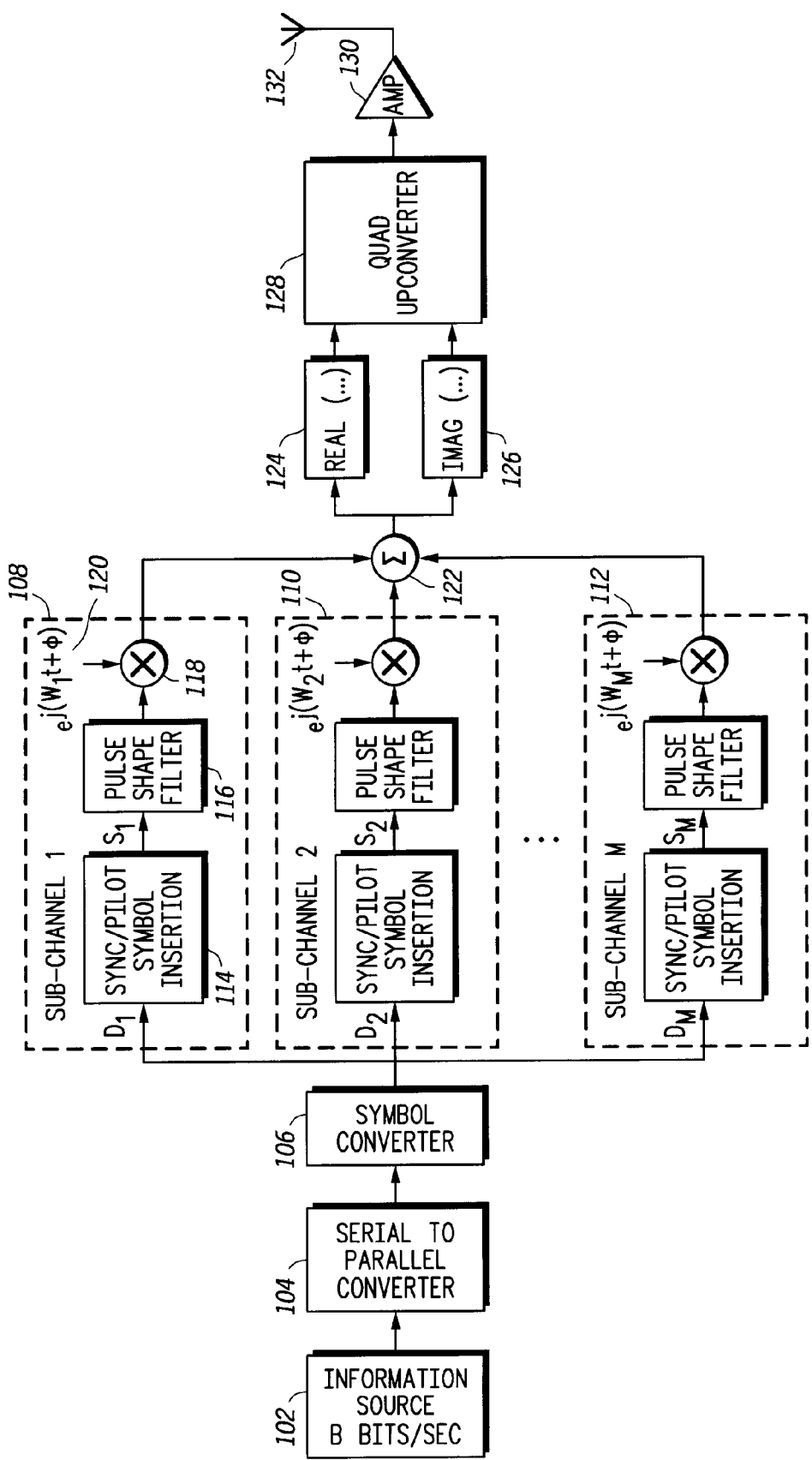
FIG. 1 is a block diagram of a multi-channel QAM transmitter according to one embodiment of the present invention.

According to one embodiment of the present invention, there is provided a scalable pattern methodology defining positions of synchronization symbols, pilot symbols and data symbols for various numbers of sub-channels in a multi-carrier communication system. The method comprises defining a base pattern identifying positions of data symbols, synchronization symbols and pilot symbols for a first number of sub-channels corresponding to a first bandwidth. The base pattern is replicated one or more times to form an expanded pattern identifying positions of data symbols, synchronization symbols and pilot symbols for an expanded number of sub-channels corresponding to a second bandwidth. For example, in one embodiment, the base pattern identifies a pattern of data symbols, synchronization symbols and pilot symbols for eight sub-channels and corresponding to a bandwidth of 50 kHz. With the base pattern so defined for eight sub-channels and a bandwidth of 50 kHz, the expanded pattern may identify the positions of data symbols, synchronization symbols and pilot symbols for sixteen sub-channels, corresponding to a bandwidth of 100 kHz if the base pattern is replicated once, or twenty-four sub-channels, corresponding to a bandwidth of 150 kHz, if the base pattern is replicated twice, and so forth.

According to another embodiment of the present invention, in a communication system wherein information in a first information signal is subdivided into M bit streams, each of the M bit streams being encoded to 16QAM symbols to form M symbol streams, whereby synchronization and pilot symbols are inserted into each of the M symbol streams, yielding M composite symbol streams filling a time-division multiplex slot, there is provided an improved method of positioning synchronization and pilot symbols within the time-division multiplex slot. A base pattern is defined identifying positions of the synchronization symbols and pilot symbols for a subset of the M composite symbol streams. The base pattern is replicated one or more times to form an expanded pattern identifying positions of the synchronization symbols and pilot symbols within the M composite symbol streams, and the synchronization and pilot symbols are inserted into the M symbol streams at positions determined by the expanded pattern.

According to still another embodiment of the present invention, there is provided a method for a communication device to transmit a composite signal made up of a scalable number of sub-channels substantially as described. The communication device receives an information signal and subdivides the information signal into M bit streams, encodes each of the M bit streams to 16QAM symbols to form M symbol streams and inserts synchronization and pilot symbols into each of the M symbol streams at positions determined by an expanded pattern, yielding M composite symbol streams filling a time-division multiplex slot, the expanded pattern having been constructed by replicating a base pattern identifying positions of the synchronization symbols and pilot symbols for a subset of the M composite symbol streams. The communication device then modulates separate carrier signals with each of the M composite symbol streams, yielding M sub-channels centered about a center frequency. The M sub-channels are combined into a composite signal that is transmitted over an RF channel.

According to still yet another embodiment of the present invention, there is provided a method for a communication device to process a composite signal made up of a scalable number of sub-channels substantially as described. The communication device receives a transmitted signal, wherein the transmitted signal comprises a signal formed from a first information signal by subdividing the first information signal into M bit streams, encoding each of the M bit streams to 16QAM symbols to form M symbol streams, inserting synchronization and pilot symbols into each of the M symbol streams, yielding M composite symbol streams filling a time-division multiplex slot, the synchronization and pilot symbols having been inserted into the M symbol streams at positions determined by an expanded pattern constructed by replicating a base pattern identifying positions of the synchronization symbols and pilot symbols for a subset P of the M composite symbol streams, modulating separate carrier signals with the M composite symbol streams to yield M sub-channels, and combining the M sub-channels into the composite signal. The communication device recovers the M composite symbol streams, performs pilot interpolation in the M composite symbol streams to achieve coherent demodulation and estimate the effects of channel impairments on the data symbols in the M composite symbol streams, and corrects the data symbols to overcome the effects of the channel impairments.

Turning now to the drawings and referring initially to FIG. 1, there is shown an M sub-channel transmitter 100 according to one embodiment of the present invention. The transmitter 100 performs the function of transmitting a stream of binary data over a radio channel. In one embodiment, the binary data is split among M sub-channels with each sub-channel using QAM modulation. Alternatively, the sub-channels may use different types of modulation such as, for example, QPSK or 64-QAM, or some combination thereof. In one embodiment many of the functions of the transmitter 100 are performed by a digital signal processor (hereinafter "DSP") such as one of the DSP 56000 family of processors, commercially available from Motorola, Inc. As is well known in the art, a DSP is a type of microprocessor that has been optimized to perform mathematical operations at very high speeds.

The transmitter 100 receives information from an information source 102. In the embodiment of FIG. 1, the information to be transmitted comprises a stream of bits. This stream of bits can represent data from a computer, digitized voice, digitized video, or any other signal that can be represented by a stream of binary digits. The bit stream from the information source is sent into a serial to parallel converter 104 where it is split into M different streams. Each of the M different bit streams is then sent into a symbol converter 106 which transforms the bit streams into symbol streams appropriate for the selected modulation type. Thus, for example, where 16 QAM modulation is used, the symbol converter 106 transforms each of the M different streams of bits into a stream of QAM symbols. Alternatively, it will be appreciated that the serial to parallel converter 104 and symbol converter 106 may be interchanged so that the stream of bits is first transformed to QAM symbols and then the resulting stream of QAM symbols is split into M different streams.

Figure 2:
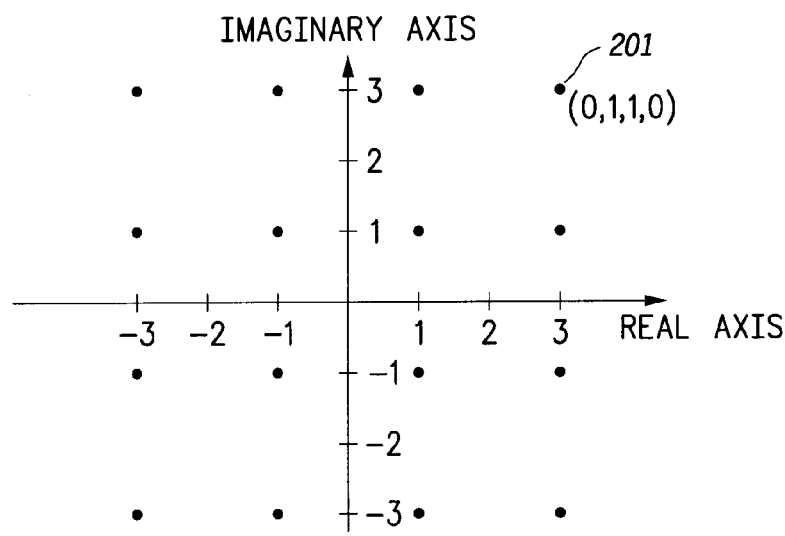
FIG. 2 shows an example of a 16-QAM symbol constellation.

In one embodiment of the invention, the symbol stream out of the symbol converter 106 comprises 16 QAM symbols. A 16-QAM system uses an alphabet of 16 discrete complex symbols. For QAM, the symbols can be envisioned as points in a Cartesian coordinate system with the real portion of the symbols along one axis and the imaginary portion of the symbols along the other axis as is shown in FIG. 2. This kind of diagram is referred to as a symbol constellation. An input symbol 201 may be characterized as a complex number such as 3+3$i$. Each complex symbol in a 16-QAM constellation may be uniquely mapped to a four digit binary number since there are 16 symbols in the alphabet. For example, the symbol 3+3$i$ may be mapped to the binary number 0110. It will be appreciated that the binary numbers corresponding to the various symbols may be arbitrarily selected as long as each four digit binary number maps to a unique 16 QAM symbol.

When the symbol converter 106 receives the M bit streams from the serial to parallel converter 104, it parses each respective bit stream into groups of bits corresponding to the number of bits that represent the various symbols of the selected type of modulation, then maps the groups of symbols into the appropriate symbol. Thus, in a 16-QAM system, the bit streams are parsed into groups of four bits. Each group of four bits is then mapped to the corresponding 16-QAM symbol using the mapping discussed above. Alternatively, the conversion from bit stream to the 16-QAM symbol stream may be done by using the well known method of convolutional encoding. Still other embodiments may have a symbol converter 106 that transforms the stream of bits to QPSK, 64-QAM, or some other symbol constellation instead of 16-QAM.

Returning to FIG. 1, the M streams of complex symbols are sent from the symbol converter 106 to the M sub-channel processing blocks 108, 110, 112. For convenience, the processing block 108 for only the first sub-channel will be described in detail herein, inasmuch as the processing blocks for the other sub-channels 110, 112 operate in substantially similar fashion as the first processing block 108. To that end, turning to the first processing block 108, a data symbol stream $D_1$ is provided from the symbol converter 106 to the sync/pilot symbol insertion block 114. This block inserts synchronization ("sync") symbols and pilot symbols into the data symbol stream, $D_1$, yielding a composite symbol stream $S_1$. According to one embodiment of the present invention, the pilot and sync symbols are inserted into the various data symbol streams, $D_1$ to $D_M$ at positions determined by an expanded pattern as will be described in greater detail in relation to FIG. 5. The composite stream $S_1$ is then sent to the pulse shape filter block 116, which shapes each pilot, sync, and data symbol for transmission. The purpose of the shaping is to bandlimit the spectrum of each sub-channel so that it does not overlap other sub-channels or signals.

Figure 3:
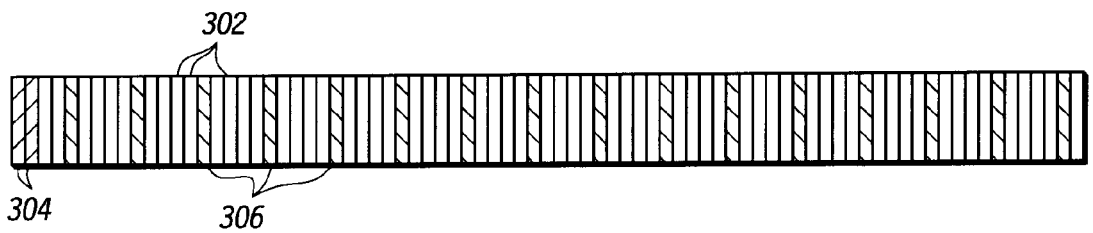
FIG. 3 shows an example of a symbol stream after insertion of synchronization and pilot symbols.

FIG. 3 shows an example of a composite symbol stream after the insertion of sync and pilot symbols for one time slot of a time division multiplex (TDM) system. The time slot is comprised mostly of data symbols 302 that are obtained by mapping binary data to symbols from the symbol constellation. Sync symbols 304 are positioned at the beginning of the slot to allow the receiver to determine the best position to perform symbol sampling. The symbol stream also contains pilot symbols 306 inserted at selected intervals. The pilot symbols 306 are used by the receiver to determine the phase of the carrier and to estimate the effects of various channel impairments (e.g., noise, distortion) on the signal as it travels from transmitter to receiver. The receiver knows the characteristics of the pilot and sync symbols that will be transmitted as well as their position in the TDM time slot. This can be achieved by either using the same pilot and sync symbols for every time slot or by using the same algorithm in both the transmitter and receiver to calculate the sync and pilot symbols. It should be noted that the pilot and sync symbols do not have to come from the same signal constellation as the data symbols. When the receiver receives the signal, a comparison can be made between the pilot symbols received and the pilot symbols transmitted to allow the receiver to estimate the effects of the communication channel impairments. The received symbol stream can then be adjusted to compensate for phase and amplitude errors of the received data symbols.

Returning again to the sub-channel processing block 108 of FIG. 1, after passing through the pulse shape filter 116, each sub-channel stream must be frequency translated to a separate sub-carrier frequency. In one embodiment, this frequency translation is accomplished by a complex mixer 118, which modulates the sub-channel symbol stream by a sub-carrier signal 120. Preferably, each sub-carrier is at a different frequency so that the sub-channels do not overlap in frequency.

After the sub-channel symbol streams have been shifted up to their sub-carrier frequencies, these sub-channel outputs are combined by a summation block 122 to form a composite signal, S(t). The real and imaginary parts of the composite signal S(t) are separated by blocks 124, 126 and then provided to a quadrature upconverter 128. As is well known in the art, the quadrature upconverter mixes the real and imaginary parts of the composite signal S(t) up to radio frequency. The upconverted signal is supplied to an amplifier 130 and then applied to an antenna 132 for transmission.

In one embodiment of the invention, the operations of the pulse shape filter 116, sub-channel mixer 118, and summation block 122 are performed in a DSP using a fast Fourier transform (FFT) filter bank. The use of such a filter bank to implement a multi-sub-channel modulator is illustrated in "Multirate Digital Signal Processing" by Ronald E. Crochiere and Lawrence R. Rabiner, pp. 297–324, published by Prentice-Hall, Inc., incorporated herein by reference.

Figure 4:
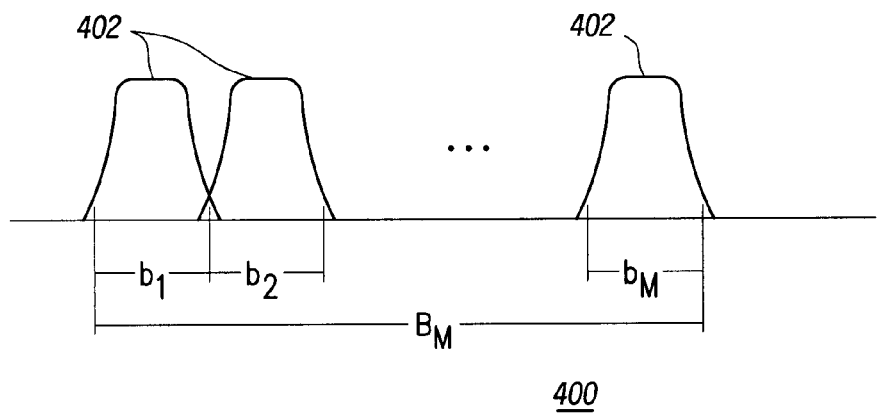
FIG. 4 shows an example of the frequency spectrum for an M sub-channel QAM system.

FIG. 4 shows one example of the frequency spectrum of the composite signal S(t) for an M sub-channel system. The composite signal S(t) is made up of M sub-channels 402 spanning respective sub-channel bandwidths $b_1, b_2, \ldots b_M$, and the entire M sub-channels approximately span a bandwidth $B_M$. Generally, the number of sub-channels M may comprise an arbitrary number of sub-channels. The spacing of the sub-channels 402 is chosen to be far enough apart such that the sub-channels 402 do not significantly overlap yet are close enough together that the total bandwidth of the signal does not exceed the available bandwidth.

The bandwidth $B_M$ of the composite signal is also somewhat arbitrary but may be dictated by a regulatory authority, such as the Federal Communication Commission ("FCC") in the United States. For example, in the 746–806 MHz band, the FCC recommends a channelization strategy that would permit three channel types: 50 kHz, 100 kHz or 150 kHz. According to one embodiment of the present invention, the bandwidth $B_M$ comprises 50 kHz, 100 kHz or 150 kHz, and the number of sub-channels M comprises 8, 16, or 24 respectively, corresponding to those three channel types. In one embodiment, each sub-channel spans a bandwidth of 5.4 kHz. This results in an occupied signal bandwidth of 44 kHz, 87 kHz, and 130 kHz for the 8, 16, and 24 sub-channel embodiments, fitting into the respective 50 kHz, 100 kHz, and 150 kHz channel types. It will be appreciated, however, that the bandwidth $B_M$, the number of sub-channels and/or the sub-channel bandwidths may be tailored to suit different communication system parameters or different regulatory requirements.

Figure 5:
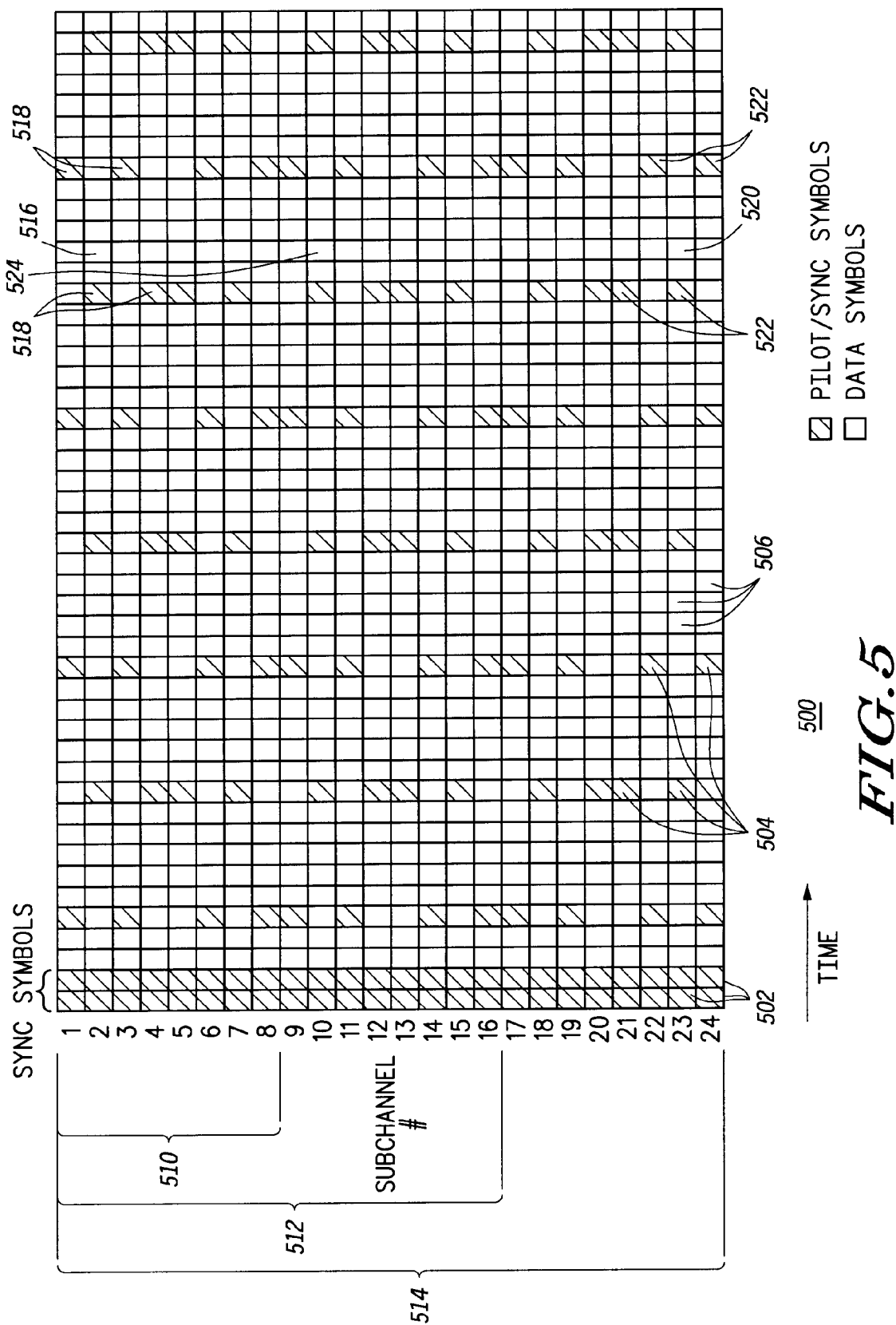
FIG. 5 shows a pattern of synchronization, pilot and data symbols that is scalable between eight, sixteen and twenty-four sub-channels, corresponding to respective bandwidths of 50 kHz, 100 kHz and 150 kHz according to one embodiment of the present invention.

FIG. 5 depicts a TDM slot structure 500 identifying positions of synchronization symbols 502, pilot symbols 504 and data symbols that is scalable between eight, sixteen and twenty-four sub-channels, corresponding to respective bandwidths of 50 kHz, 100 kHz and 150 kHz according to one embodiment of the present invention. The sub-channels, labeled 1–24 are shown on the vertical axis of the diagram. The horizontal axis represents time. Each square in the diagram represents the location of a sync, pilot, or data symbol in the time division multiplex (TDM) slot. The shaded squares are the sync symbol 502 and pilot symbol 504 locations. The locations of the data symbols 506 are shown by the blank squares.

As shown, the TDM slot structure 500 may be considered as defining three different groups or patterns of sync, pilot and data symbols. Group 510 defines a base pattern identifying positions of data symbols, synchronization symbols and pilot symbols for eight sub-channels, corresponding to a bandwidth of 50 kHz. Groups 512 and 514 define expanded patterns identifying positions of data symbols, synchronization symbols and pilot symbols for sixteen sub-channels, corresponding to a bandwidth of 100 kHz, and twenty-four sub-channels, corresponding to a bandwidth of 150 kHz, respectively. Either pattern may be used depending on the available bandwidth.

An inspection of FIG. 5 reveals that the expanded patterns 512, 514 are formed from one or more replications of the base pattern. Thus, in the illustrated embodiment, the expanded pattern 512 comprises two replications of group 510 that defines the 8 sub-channel base pattern and the expanded pattern 510 comprises three replications of the 8 sub-channel base pattern. In a similar manner, the 8 sub-channel group 510 can be thought of as an expanded pattern that comprises only one replication of the 8 sub-channel base pattern. Hence, the signals are created from replications of the base pattern. Generally, in the illustrated embodiment, where the base pattern consists of P sub-channels and the expanded pattern comprises N replications of the base pattern, the expanded pattern will comprise N υ P sub-channels, where N and P are positive integers, and the expanded pattern will generally occupy a bandwidth that is N times greater than the bandwidth associated with the base pattern. That is, with reference to FIG. 4, if the expanded pattern comprises M sub-channels, and a composite signal is formed by modulating M separate carrier signals with M sub-channel symbol streams, the bandwidth $B_M$ of the composite signal will be N times greater than a bandwidth $B_P$ of a composite signal that would result by performing corresponding steps with P sub-channels.

Because the expanded patterns 512, 514 are replicas of the base pattern, the positions of the data symbols, synchronization symbols and pilot symbols in the expanded patterns correspond to their respective positions in the base pattern. Thus, for example, in the illustrated embodiment, sync symbols occupy the first two positions of each sub-channel of the TDM slot in group 510 (sub-channels 1–8), and they similarly occupy the first two positions of each sub-channel of the TDM slots in sub-channels 9–16 (i.e., the first replica of the base pattern) and sub-channels 17–24 (i.e., the second replica of the base pattern). Similarly, pilot symbols occupy (among other positions) the fifth position in sub-channels 1, 3, 6 and 8 in group 510, and they occupy corresponding positions in sub-channels 9, 11, 14 and 16, and sub-channels 17, 19, 22 and 24, and so forth.

As will be appreciated, while FIG. 5 illustrates a pattern methodology for a particular TDM slot structure 500 according to one embodiment of the current invention, other slot structures are possible. For example, the base pattern (group 510) can be varied to include different positions of data symbols, sync symbols and/or pilot symbols, different numbers of sub-channels, different length TDM time slots, etc., and expanded patterns may comprise more than three replications of the base pattern. However, in any case the TDM time slot structure will be created by taking one or more replications of a base pattern to form an expanded pattern of pilot and sync symbols. The number of sub-channels in the expanded pattern will be an integer multiple of the number of sub-channels in the base pattern.

Figure 6:
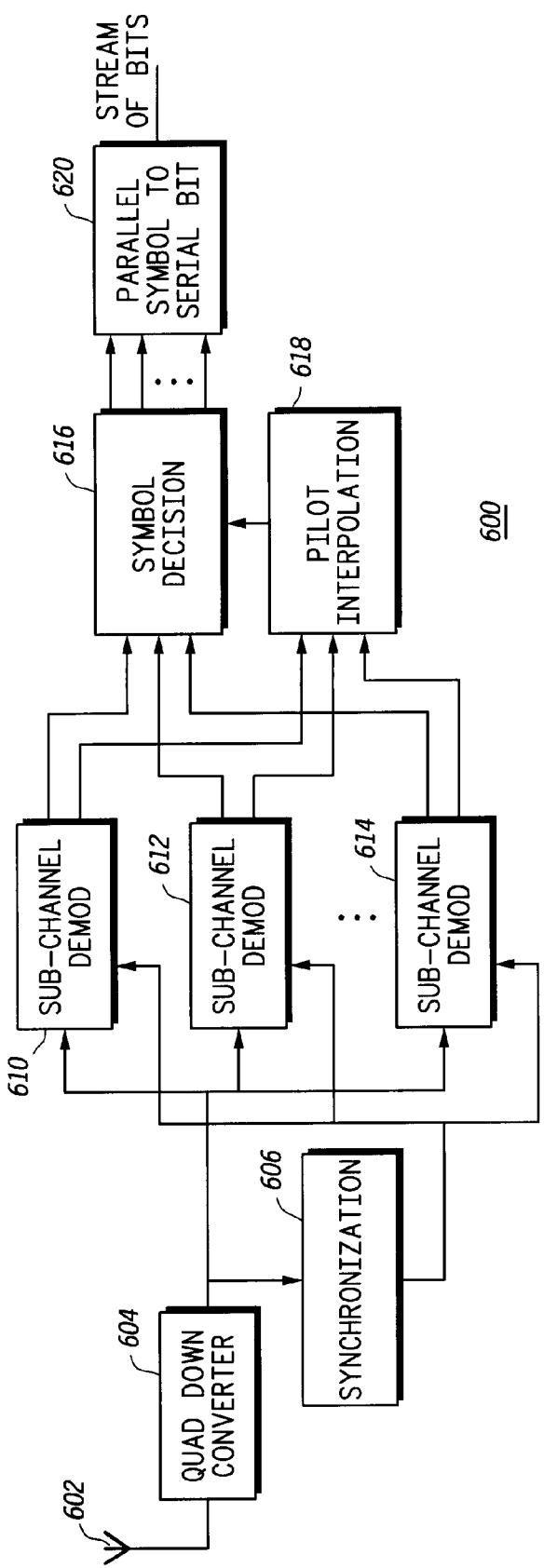
FIG. 6 is a block diagram of a multi-channel QAM receiver according to one embodiment of the present invention.

FIG. 6 shows a receiver 600 that may be used in conjunction with the transmitter 100 (FIG. 1). The receiver 600 includes an antenna 602 for receiving the M sub-channel QAM signal from the transmitter after it has been corrupted by the communications channel. These corruptions can include frequency selective, Rayleigh, and Rician fading, the addition of noise, or a Doppler shift. The signal is then sent to a quadrature downconverter 604 that translates the received signal down from the radio frequency so that it is centered substantially at 0 Hz. The downconverted signal is then sent into M sub-channel demodulator blocks 610, 612, 614 and a synchronization block 606.

The synchronization block 606 uses the sync symbols of the TDM time slot 500 (FIG. 5) to determine when the time slot begins and when to sample each data, sync, and pilot symbol so that samples are obtained in the center of the symbol pulse shape. Synchronization subsystems are well known in the art. One example of a synchronization subsystem for a 4 sub-channel QAM signal can be found in U.S. Pat. No. 5,343,499 titled "Quadrature Amplitude Modulation Synchronization Method" (hereinafter "the '499 patent") assigned to the assignee of the present invention and incorporated herein by reference in its entirety. It will be appreciated that a synchronization subsystem for an M sub-channel QAM system can be easily generalized from the 4 sub-channel QAM system taught in the '499 patent. The timing information obtained by the synchronization block 606 is sent to the M sub-channel demodulators 610, 612, 614.

The M sub-channel demodulators 610, 612, 614 receive as inputs the M sub-channel signal from the quadrature downconverter 604 and the timing information from the synchronization subsystem 606. The sub-channel demodulator outputs corrupted raw data, pilot, and sync symbols. These corrupted symbols differ from the symbols that were sent by the transmitter 100 (FIG. 1) because of the effects of the communication channel. The corrupted data symbols are sent from the sub-channel demodulation block 610, 612, 614 to a symbol decision block 616 and the corrupted pilot and sync symbols are sent from the sub-channel demodulator 610, 612, 614 to a pilot interpolation block 618.

Figure 7:
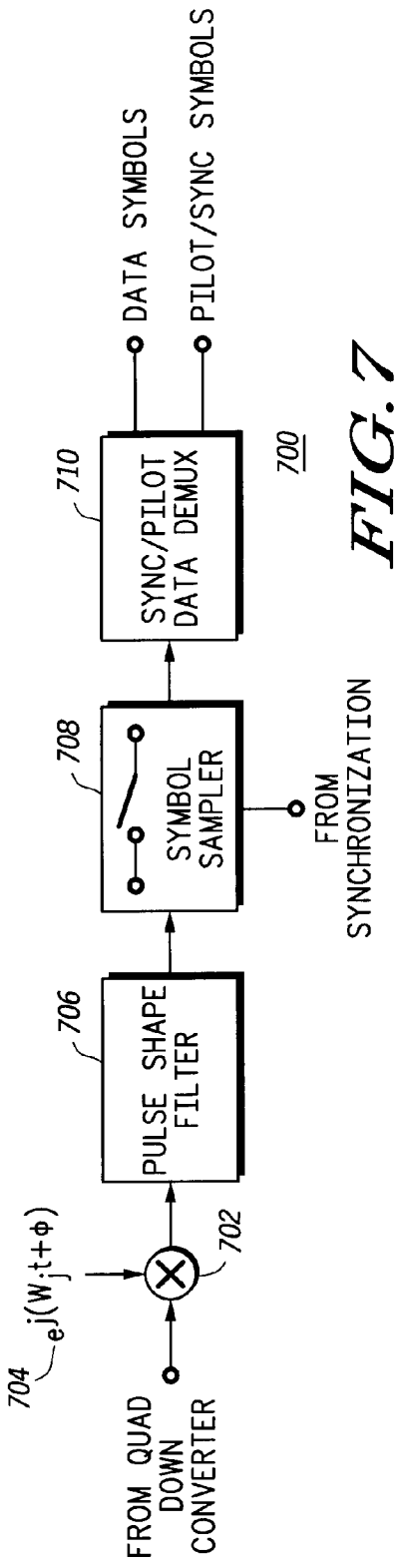
FIG. 7 is a block diagram of a sub-channel demodulation block used in the QAM receiver of FIG. 6 according to one embodiment of the present invention.

FIG. 7 shows one of the sub-channel demodulation blocks in more detail. The composite signal received from the quadrature downconverter 604 (FIG. 6) is sent into a complex mixer 702 to translate the sub-channel being demodulated from the sub-carrier frequency to 0 Hz. This is done by mixing the received downconverted signal by a sub-carrier signal 704. The signal from the mixer 702 is then sent into a pulse shape filter 706. The pulse shape filter 706 removes all the other sub-channels except for the one centered at 0 Hz from the composite signal. The signal out of the pulse shape filter is then sent into a symbol sampler 708. The symbol sampler 708 samples the signal at the center of the pulse shape so that corrupted sync, pilot, or data symbols are obtained. The symbol sampler uses the input from the synchronization block 606 (FIG. 6) to determine when to do this sampling.

The corrupted sync, pilot, and data symbols from the symbol sampler 708 are sent to a sync/pilot data symbol demultiplexer 710. The sync/pilot data symbol demultiplexer splits the stream of corrupted symbols received from the symbol sampler 708 into two streams. The corrupted data symbols are sent to the symbol decision block 616 (FIG. 6) and the corrupted pilot and sync symbols are sent to the pilot interpolation block 618 (FIG. 6).

The pilot interpolation block 618 receives corrupted pilot and sync symbols from the sync/pilot data symbol demultiplexer 710 from all of the M sub-channel demodulators 610, 612, 614. It produces estimates of the effects of the communication channel for each of the data symbols. These channel estimates are sent from the pilot interpolation block 618 to the symbol decision block 616 where they are used to determine what symbols the receiver sent. One particular pilot-based communication channel estimation method that could be used by the pilot interpolation block 618 is detailed in the U.S. patent application Ser. No. 07/783,289, titled "Communication Signal Having A Time Domain Pilot Component," assigned to the assignee of the current invention and incorporated herein by reference in its entirety.

In one embodiment of the present invention, filter coefficients for each data symbol location are determined based on which pilot and sync symbols in the slot are being used. The filter coefficients are a function of the relative distance in both time and frequency between the data symbol location and the pilot and sync symbol locations used in the communication channel gain and phase estimation. Because of symmetry in the TDM time slot structure it can be possible to reuse the filter coefficients for multiple data symbol locations. For example, consider the TDM time slot 500 of FIG. 5. Suppose that the channel gain and phase for the data symbol 516 were being estimated using the pilot symbols 518. The same pilot interpolation coefficients would be used as when estimating the communication channel gain and phase at the data symbol location 520 using the pilot symbols 522. This is because the distance in time and frequency between the data symbol 516 and the pilot symbols 518 is the same as the distance between the data symbol 520 and the pilot symbols 522. By this example it will be appreciated that symmetry in the TDM time slot structure can reduce the number of pilot interpolation coefficient sets required for the time slot. This means that there is less effort required to calculate the filter coefficients and savings in the memory required to store the filter coefficients in the receiver hardware.

According to principles of the present invention, where the TDM time slot is generated by replicating a base pattern of sync, pilot, and data symbols a number of times, the complexity of the receiver can be further reduced. Pilot interpolation coefficients are first calculated for all the data symbol locations in the base pattern only using the pilot and sync symbols within the base pattern. Then when the base pattern is replicated, the same pilot interpolation coefficients can be used for the data symbol locations in the replicated portions of the time slot, allowing for reduced computational complexity in the receiver.

For example, consider the case of a receiver adapted to recover sixteen sub-channels, having sync and pilot symbols positioned according to an expanded pattern formed by replicating a base pattern of eight sub-channels. With reference to FIG. 5, data symbol 516 (sub-channel 2) and data symbol 524 (sub-channel 10) occupy corresponding positions in the expanded pattern. It can be seen that the time and frequency distances between the position of data symbol 516 relative to the pilot and sync symbols in sub-channels 1–8 are the same as the time and frequency distances between the position of data symbol 524 relative to the pilot and sync symbols in sub-channels 9–16. The same is true for all other corresponding data symbol locations. Consequently, there is achieved a substantial reduction in receiver complexity for the sixteen sub-channel receiver relative to the prior art because the pilot interpolation coefficients (and hence the pilot interpolation filters) that can be used by the sixteen sub-channel receiver to recover certain data symbols in the expanded pattern are the same as those that would be used by an eight sub-channel receiver to recover the corresponding symbols in the base pattern. It follows that the described reduction in receiver complexity also would apply to a twenty-four sub-channel receiver, or any multiple of eight sub-channel receiver because those receivers may also be constructed with the same set of pilot interpolation filters as an eight sub-channel receiver.

It will be appreciated that the reduction in the receiver complexity is not dependent on the TDM time slot structure of FIG. 5. It is possible for any TDM time slot structure where the time slot pattern is generated by replicating a base pattern a number of times. Generally, it follows that any M sub-channel receiver can perform pilot interpolation with the same set of pilot interpolation filters that would be required for a subset P of the M sub-channels, where M is a multiple of P and the positions of sync and pilot symbols in the P symbol streams define a base pattern that is replicated a number of times to form an expanded pattern.

Returning again to FIG. 6, the symbol decision block 616 uses the corrupted data symbols from the sub-channel demodulators 610, 612, 614 along with the channel gain and phase estimates from the pilot interpolation block 618 to determine which 16-QAM symbols were sent by the transmitter 100. One method for doing this is described in the '289 application. The symbol decision block 616 outputs 16-QAM symbols to a parallel symbol to serial bit converter 620. The parallel symbol to serial bit converter maps the 16-QAM symbols from the M sub-channels to a serial stream of bits. The mapping used to obtain the stream of bits from the 16-QAM symbols is the inverse of the mapping used by the symbol converter 106 (FIG. 1).

As with the transmitter 100 (FIG. 1), many if not all of the functions of the receiver 600 may be implemented in a DSP. Other embodiments of the receiver 600 are also possible. For example, if the transmitter 100 (FIG. 1) had used a different signal constellation instead of 16QAM, the receiver M-parallel complex symbols to serial bit block 620 would have to use the same signal constellation as the transmitter 100 (FIG. 1). If instead of using a mapping from bits to a symbol constellation the transmitter had used the well known method of convolutional encoding, the receiver would have to use an appropriate decoding method to return to a serial bit stream. One such method is described in the U.S. Pat. No. 5,134,635 titled "Convolutional Decode Using Soft-Decision Decoding With Channel State Information" assigned to the assignee of the present invention and incorporated herein by reference in its entirety.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system that uses time-division multiplex slots, a method of positioning synchronization and pilot symbols within the time-division multiplex slot comprising the steps of:

defining a base pattern of synchronization, pilot, and data symbols for P sub-channels corresponding to a first channel bandwidth $B_P$;

replicating the base pattern N times to form an expanded pattern of synchronization, pilot, and data symbols for N×P sub-channels corresponding to a second channel bandwidth $B_M$ being N times greater than the first channel bandwidth $B_P$;

subdividing an information signal into M bit streams, where M=N×P;

encoding each of the M bit streams into data symbols to form M symbol streams; and inserting the synchronization and pilot symbols into the M symbol streams yielding M composite symbol streams, the synchronization and pilot symbols being inserted at positions determined by the expanded pattern.

2. The method of claim 1, further comprising the step of modulating separate carrier signals with each of the M composite signal streams, yielding M sub-channels centered about a center frequency and having tho bandwidth $B_M$.

3. The method of claim 2, further comprising the steps of:

combining the M sub-channels into a composite signal; and transmitting the composite signal over an RF channel.

4. The method of claim 3, further comprising the steps of:

receiving the composite signal;

recovering the M composite symbol streams;

performing pilot interpolation in the M composite symbol streams to estimate the effects of channel impairments on the data symbols in the M composite symbol streams; and correcting the data symbols to overcome the effects of the channel impairments.

5. The method of claim 4 wherein the step of performing pilot interpolation in the M composite symbol streams is performed by a set of pilot interpolation filters operable to perform pilot interpolation on a composite signal having P sub-channels and containing synchronization, pilot, and data symbols at locations defined by the base pattern.

6. A method comprising a communication device performing the steps of:

receiving a transmitted signal, wherein the transmitted signal comprises a signal formed from a first information signal by subdividing the first information signal into M bit steams, encoding each of the M bit steams to data symbols to form M symbol steams, inserting synchronization and pilot symbols into each of the M symbol streams, yielding M composite symbol streams filling a time-division multiplex slot, the synchronization and pilot symbols having been inserted into the M symbol streams at positions determined by an expanded pattern comprising two or more replications of a base pattern identifying positions of the synchronization symbols and pilot symbols for a subset P of the M composite symbol streams, modulating separate carrier signs with the M composite symbol steams to yield M sub-channels, and combining the M sub-channels into the transmitted signal;

recovering the M composite symbol streams;

performing pilot interpolation on the M composite symbol streams to achieve coherent demodulation and estimate the effects of channel impairments on the data symbols in the M composite symbol streams by using a set of pilot interpolation filters that is operable to perform pilot interpolation on the subset P of the M composite symbol streams for which the base pattern identifies positions of synchronization and pilot symbols; and correcting the data symbols to overcome effects of the channel impairments.

\* \* \* \* \*

UNITED STATES PATENT AND TRADEMARK OFFICE
CERTIFICATE OF CORRECTION

PATENT NO.   : 6,424,678 B1
DATED        : July 23, 2002
INVENTOR(S)  : Doberstein et al.

It is certified that error appears in the above-identified patent and that said Letters Patent is hereby corrected as shown below:

Column 11,
Line 12, from "signs with the M composite symbol steams to yield M" to -- signals with the M composite symbol streams to yield M --

Column 12,
Line 11, from "correcting the data symbols to overcome effects of the" to -- correcting the data symbols to overcome the effects of the --

Signed and Sealed this

Twenty-ninth Day of July, 2003

JAMES E. ROGAN
*Director of the United States Patent and Trademark Office*